Nov. 15, 1938.　　　F. A. ANETSBERGER　　　2,136,535
COOKING UTENSIL
Filed Nov. 16, 1936
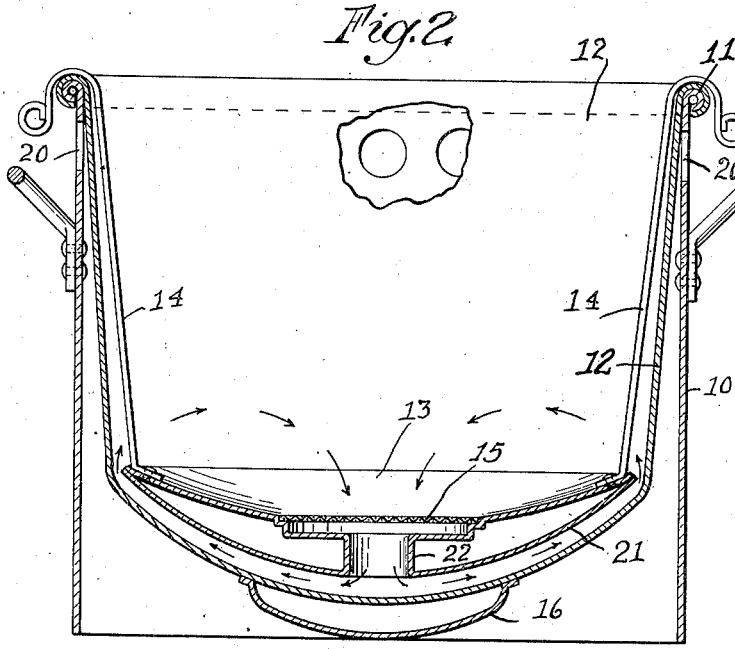
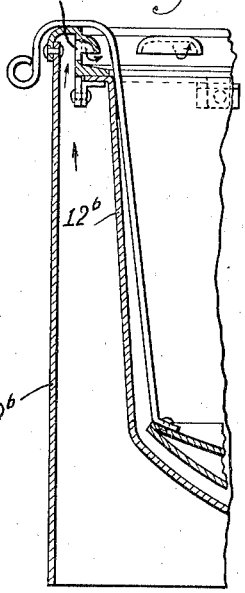
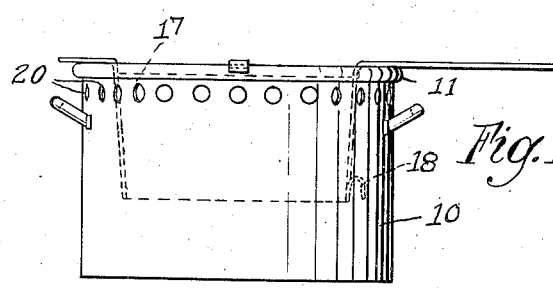
Inventor
FRANK A. ANETSBERGER
by Sheridan, Davis & Cargill
Attorneys Patented Nov. 15, 1938

2,136,535

UNITED STATES PATENT OFFICE 2,136,535

COOKING UTENSIL

Frank A. Anetsberger, Chicago, Ill.

Application November 16, 1936, Serial No. 111,008

3 Claims. (Cl. 53—7)

This invention relates to improvements in cooking utensils.

One object of the invention is to provide a deep fat frying utensil which directs waste heat in an upwardly flowing annular sheath which protects the surface of the fat or grease from surrounding cool air and thus not only effects an economy in fuel consumption, but resists fluctuations in the temperature of the surface of the liquid and thereby assures greater uniformity in the cooking of the products. When food is removed from the hot liquid of a deep fat frier, it generally is supported for a few moments above the receptacle to permit excess oil or fat to drain back into the receptacle, and the annular sheath of hot rising gases above mentioned prevents sudden cooling of the food during such draining period, and thus enables the oil to drain from the food more completely.

Other advantages relate to various features and advantages which will be apparent from a consideration of the following specification and accompanying drawing, wherein:

Figure 1 is a side elevation of a utensil embodying the present improvements.

Figure 2 is a vertical section through a utensil, embodying the present improvements.

Figure 3 is a broken similar vertical section illustrating a modification of the improvements.

In the drawing, the utensil is shown as comprising an outer shell 10 open at the bottom, and at its upper end secured as by a roll 11 and supporting an inner bowl or receptacle 12 in which the cooking liquid, such as oil or fat, is placed. Within the receptacle 12 is a tray 13 which is supported in spaced relation with respect to the bottom of the receptacle 12 as by handles 14 which hook over the upper edge of the receptacle 12. The tray 13 is provided with a screened opening 15.

Disposed centrally of the bottom of the member 12 and to the outer surface thereof is an insulating member 16. When heat is applied to the bottom of the member 12, the insulator shields the central column of liquid within the receptacle and creates convection currents which flow in the direction of the arrows shown in Figure 2. This results in the accumulation of crumbs from a basket 17 in which the food to be cooked is placed. The crumbs and food particles thus accumulate in the tray 13 and are prevented from settling to the bottom of the member 12 and becoming charred and foul the cooking liquid.

The basket 17 is of wire and in cooking position is supported within the cooking liquid above the tray 13. Preferably the basket is provided with a hook 18 adjacent its lower end by which it may be supported in elevated position, whereby the excess oil within the food may drain back into the receptacle.

As shown in Figure 2 the outer shell 10 is provided with an annular row of heat outlets or ports 20 which are disposed adjacent the upper edge of the receptacle. The hot gases from the source of heat may thus rise upwardly between the shell 10 and the receptacle 12 and pass through the openings 20 to provide an upwardly rising annular sheath of hot gases which keep the cooked products hot after the basket 17 has been raised above the hot liquid and during the draining of the liquid therefrom.

A tray 13 is provided with a false bottom 21 sealed at its edges to the tray and both supported by handles 14 to space the bottom 21 from the bottom of the receptacle. Joining the tray 13 and the bottom 21 is a tube 22 through which the descending column of liquid can pass whence it flows radially outwardly and upwardly to effect the circulation of the cooking liquid as indicated by the arrows in Fig. 2.

Above the passage 22 is the removable strainer 15 which collects the food particles and like sediment and prevents the same from passing to the bottom of the receptacle and there becoming charred. The space between the tray 13 and the bottom 21 constitutes an insulating chamber which in cooperation with the insulator 16 effects rapid circulation of the cooking liquid.

In the form of the invention shown in Figure 3 no heat exhaust ports are provided in the shell 10b but ports 20b are provided in the receptacle 12b above the normal level of the cooking liquid. These ports 20b preferably are in the form of louver openings which direct the hot gases inwardly, whence they rise in the form of a column or annular sheath and protect the surface of the oil from excess heat radiation, thus effecting economy in fuel consumption. It will also be seen that when a basket, such as the basket shown in Figure 1, is in draining position the hot gases rising from the louver openings 20b in the form of an annular column or sheath will keep the cooked products at an elevated temperature and thus permit the cooking liquid to more completely drain into the receptacle. The present invention is an improvement over that shown in my Patent #2,061,533, granted November 17, 1936.

While I have shown and described certain embodiments of my improvements for the purpose of illustration, I do not wish to be restricted specifically thereto except as so limited by the appended claims.

I claim:

1. A cooking utensil for use above a source of heat comprising a liquid holding receptacle, a tray provided with a false bottom united adjacent the edges thereof and centrally spaced apart to provide a heat insulating space therebetween, means for supporting said tray in said receptacle with said false bottom spaced from the bottom of the receptacle to provide a circulation passage therebetween, a tubular screened passage through said tray and false bottom for accommodating the flow of a column of liquid descending therethrough to said circulation passage, and an insulating member aligned with said screened passage for reducing the application of heat from said source to said descending column.

2. A cooking utensil for use above a source of heat comprising a liquid holding receptacle, an insulating tray, means for supporting said tray in said receptacle with the bottom thereof spaced from the bottom of the receptacle to provide a circulation passage therebetween, a screened passage through said tray for accommodating the flow of a column of liquid descending therethrough to said circulation passage, and an insulating member aligned with said screened passage for reducing the application of heat from said source to said descending column.

3. A cooking utensil for use above a source of heat comprising a liquid holding receptacle, a tray, means for supporting said tray in said receptacle with the bottom thereof spaced from the bottom of the receptacle to provide a circulation passage therebetween, a screened passage hrough said tray for accommodating the flow of a column of liquid descending therethrough to said circulation passage, an insulating member aligned with said screened passage for reducing the application of heat from said source to said descending column, and means for augmenting the circulation of fluid through said circulation passage comprising insulating means carried by said tray.

FRANK A. ANETSBERGER.